Nov. 8, 1955  A. G. BRACKBILL  2,722,934
DEVICE FOR ADMINISTERING PILLS
Filed Dec. 3, 1954
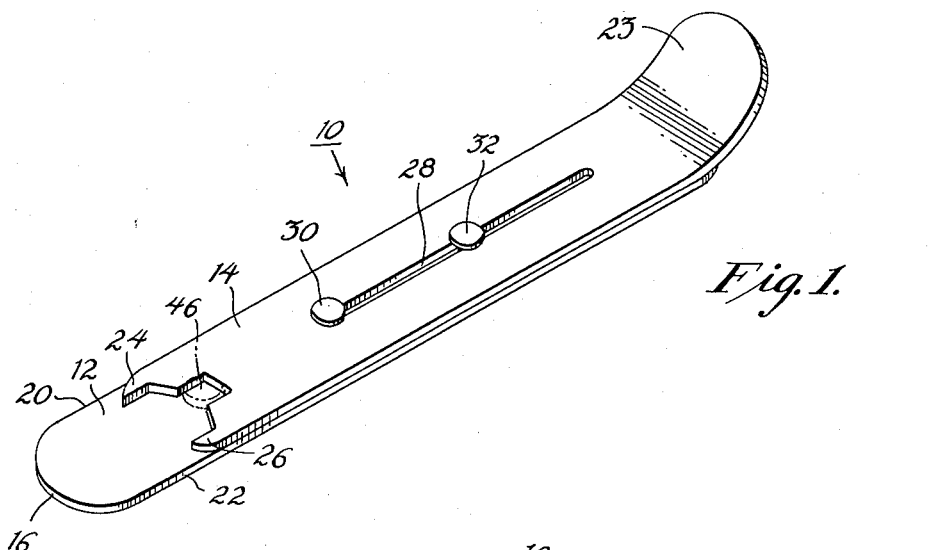
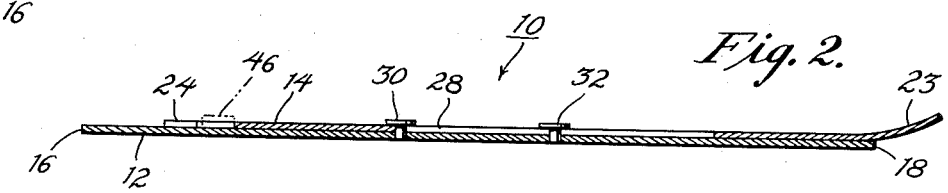
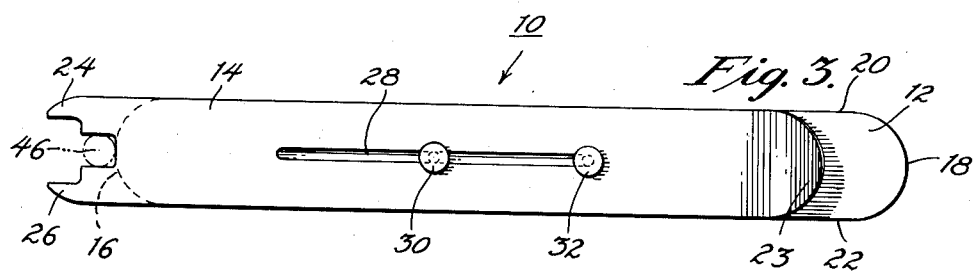
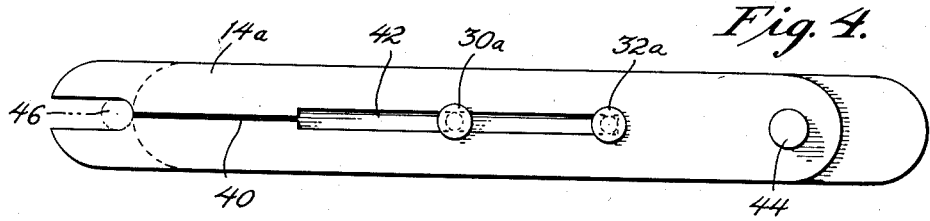
INVENTOR.
ALLEN G. BRACKBILL
BY Arthur H. Seidel
ATTORNEY.

United States Patent Office 2,722,934
Patented Nov. 8, 1955

2,722,934

DEVICE FOR ADMINISTERING PILLS

Allen G. Brackbill, Paradise, Pa.

Application December 3, 1954, Serial No. 472,927

4 Claims. (Cl. 128—264)

This invention relates to a device for administering pills, tablets, capsules and the like, and is primarily intended for use with individuals who are unable to swallow such pills, tablets, or capsules.

A large number of individuals, both children and adults, have difficulty in swallowing solid medicinal preparations. They tend to gag on such preparations, and in their endeavors to avoid swallowing the pills in toto, they tend to bite or chew the pills or tablets. As such preparations normally have an unpleasant taste, this may lead to spitting out of the preparation, particularly in the case of young children.

Moreover, it is frequently desirable that solid medicinal preparations be swallowed without prolonged retention in the mouth. Persons having difficulty in swallowing solid tablets tend to retain such tablets in their mouths for prolonged periods, while they are attempting to swallow the tablets. This may destroy the efficacy of the medicinal preparation or lead to other undesirable consequences.

An object of the present invention is to provide a facile device for administering pills, which device may be cheaply made, so that, if desired, it may be discarded readily.

A further object of the present invention is the provision of a device for administering pills and the like, in which a pill can be inserted into the pharynx when water is taken, without the pill touching the tongue.

Other objects of the present invention are apparent in the following detailed description, appended claims, and accompanying drawings.

For the purposes of illustrating this invention, a plurality of forms thereof, which are presently preferred, are shown in the accompanying drawings, it being understood, however, that the invention is not limited to the precise arrangements and instrumentalities illustrated.

In the accompanying drawings, wherein like reference characters indicate like parts throughout:

Figure 1 is a perspective view of one embodiment of the device of the present invention, with the discharge arm in its retreated position.

Figure 2 is a longitudinal vertical section of the device.

Figure 3 is a plan of the device with the discharge arm in its discharge or pill dispensing position.

Figure 4 is a plan of another embodiment of the present invention.

Referring to the drawings 10 designates the pill-administering or dispensing device of the present invention, which comprises a depressor-receptacle arm 12 and a discharge arm 14.

Both depressor-receptacle arm 12 and discharge arm 14 are preferably made of wood, but may be made of plastic or the like.

Depressor-receptacle arm 12 is a flat element having semicircular ends 16 and 18 and parallel sides 20 and 22.

Discharge or dispenser arm 14 is generally flat, but has a raised handle portion 23 at one end. The end of discharge arm 14 remote from raised handle portion 23 is notched, with projecting arms 24 and 26 defining the sides of the notch. As shown in Figure 1, when discharge arm 14 is in retreated position, the upper surface of the end 16 and the adjacent part of depressor-receptacle arm 12 serves as a floor beneath and in front of the notch defined by arms 24 and 26.

A generally elongated elliptical slot 28 extends lengthwise in the central portion of discharge arm 14 along its longitudinal axis. A pair of stop posts 30 and 32 having bulbous heads, which heads are wider than slot 28 extend through slot 28 and are fixedly secured in depressor-receptacle arm 12. Discharge arm 14 is rectilinearly movable on the upper surface of receptacle arm 12 between its retreated position (shown in Figure 1) wherein stop post 30 is engaged with the end of slot 28 adjacent projecting arms 24 and 26, and its discharge position (shown in Figure 3) wherein stop post 32 is engaged with the end of slot 28 adjacent handle portion 23.

In the embodiment of my invention shown in Figure 4, discharge arm 14a is provided with a thin slit 40 which extends from the notched end rearwardly. Slit 40 has a width appreciably narrower than posts 30a and 32a. At its rear end slit 40 is enlarged to form a generally rectangular slot 42, which is wider than posts 30a and 32a.

Discharge arm 14a is entirely flat and is provided at its semicircular rear end portion with a knob handle or stud handle 44, anchored into discharge arm 14a.

The operation of the device of the present invention is as follows:

Discharge arm 14 (or 14a) is withdrawn to its retreated position by finger pressure on handle portion 23 (or on knob handle 44). A pill, tablet, capsule or the like, shown in dotted line at 46, is placed on the upper surface of depressor-receptacle arm 12 intermediate projecting arms 24 and 26.

The patient's mouth is then opened and device 10 inserted therein. The bottom of depressor-receptacle arm 12 serves to depress the patient's tongue. Forward urging of handle portion 23 (or knob handle 44) urges discharge arm 14 (or 14a) to its discharge position, with the pill 46 being pushed into the patient's pharynx.

Application of water will result in the pill being swallowed.

The device of the present invention can be used by the patient himself through the use of a mirror.

Although the embodiments of the present invention have been described in detail, the scope thereof is not to be limited except as provided for in the here-appended claims.

I claim:

1. A device for administering pills including a depressor-receptacle arm, a discharge arm movably mounted above said depressor-receptacle arm and rectilinearly movable above the upper surface thereof, a pill-receiving notched portion in one end of said discharge arm, stop means fixedly secured to said depressor-receptacle arm for limiting the movement of said discharge arm between a retreated position wherein the pill-receiving notched portion is above the depressor-receptacle arm and a discharge position wherein at least a major portion of the pill-receiving notched portion extends beyond the end of the depressor-receptacle arm, and handle means on said discharge arm for urging said discharge arm between retreated and discharge positions.

2. A device for administering pills including a generally flat depressor-receptacle arm, a generally flat discharge arm movably mounted above said depressor-receptacle arm and rectilinearly movable on the upper surface thereof, a pill-receiving notched portion in one end of said discharge arm, a slot extending lengthwise in the central portion of said discharge arm, stop means fixedly secured to the depressor-receptacle arm extending through the slot in said discharge arm and limiting the movement of said discharge arm by engagement with the ends of the slot between a retreated position wherein the pill-receiving notched portion is above the depressor-receptacle arm and a discharge position wherein at least a major portion of the pill-receiving notched portion extends beyond the end of the depressor-receptacle arm, and handle means on said discharge arm for urging said discharge arm between retreated and discharge positions.

3. A device for administering pills including a flat depressor-receptacle arm, a generally flat discharge arm having a curved upwardly directed handle portion at one end and a pill-receiving notched portion at the other end, said discharge arm being slidably mounted on the upper surface of the depressor-receptacle arm and rectilinearly movable along said surface, an elongated slot extending lengthwise in the central portion of the discharge arm, a pair of tandem arranged and spaced stop posts fixedly secured to the depressor-receptacle arm and extending through the slot in said discharge arm, said stop posts being so situated that when the stop post most closely adjacent the notched portion of the discharge arm is engaged with the end of the slot most closely adjacent the notched portion then the pill-receiving notched portion is above the depressor-receptacle arm and when the stop post most closely adjacent the handle portion of the discharge arm is engaged with the end of the slot most closely adjacent said handle portion then at least a major portion of the pill-receiving notched portion extends beyond the end of the depressor-receptacle arm.

4. A device for administering pills including a flat depressor-receptacle arm, a generally flat discharge arm having an upwardly projecting handle portion at one end and a pill-receiving notched portion at the other end, said discharge arm being slidably mounted on the upper surface of the depressor-receptacle arm and rectilinearly movable along said surface, a relatively wide elongated slot extending lengthwise in the central portion of the discharge arm, a relatively narrow slit extending from said notch to said slot, a pair of tandem arranged and spaced stop posts fixedly secured to the depressor-receptacle arm extending through the slot in said arm, said posts having a width greater than the width of said relatively narrow slit, said stop posts being so situated that when the stop post most closely adjacent the notched portion of the discharge arm is engaged with the end of the slot most closely adjacent the notched portion then the pill-receiving notched portion is above the depressor-receptacle arm and when the stop post most closely adjacent the handle portion of the discharge arm is engaged with the end of the slot most closely adjacent said handle portion then at least a major portion of the pill-receiving notched portion extends beyond the end of the depressor-receptacle arm.

References Cited in the file of this patent

UNITED STATES PATENTS 1,562,656 Park _____ Nov. 24, 1925

FOREIGN PATENTS 632,812 Great Britain _____ Dec. 5, 1949